MONITORING SYSTEM FOR REMOTE RADIO CONTROL

Filed July 20, 1965

INVENTOR.
IRVING JACOBSON
BY Edward A Sokolski
ATTORNEY

United States Patent Office 3,363,250
Patented Jan. 9, 1968

3,363,250

MONITORING SYSTEM FOR REMOTE RADIO CONTROL

Irving Jacobson, 862 N. Vine St., Hollywood, Calif. 90038

Filed July 20, 1965, Ser. No. 473,278
7 Claims. (Cl. 343—225)

ABSTRACT OF THE DISCLOSURE

A radio receiver operates in conjunction with a radio transmitter to control various functions in response to signals received from the transmitter. The receiver and transmitter have a plurality of corresponding channels which may be selected for optimum reception of the control signals. The output of the receiver is amplified and fed to a transistor control, an indicator being connected in series with this transistor control. The indicator device indicates the presence of interfering or control signals in the input of the receiver, thereby enabling the selection of an interference-free channel and providing a positive indication of the reception of the transmitter signal.

Figure 1:
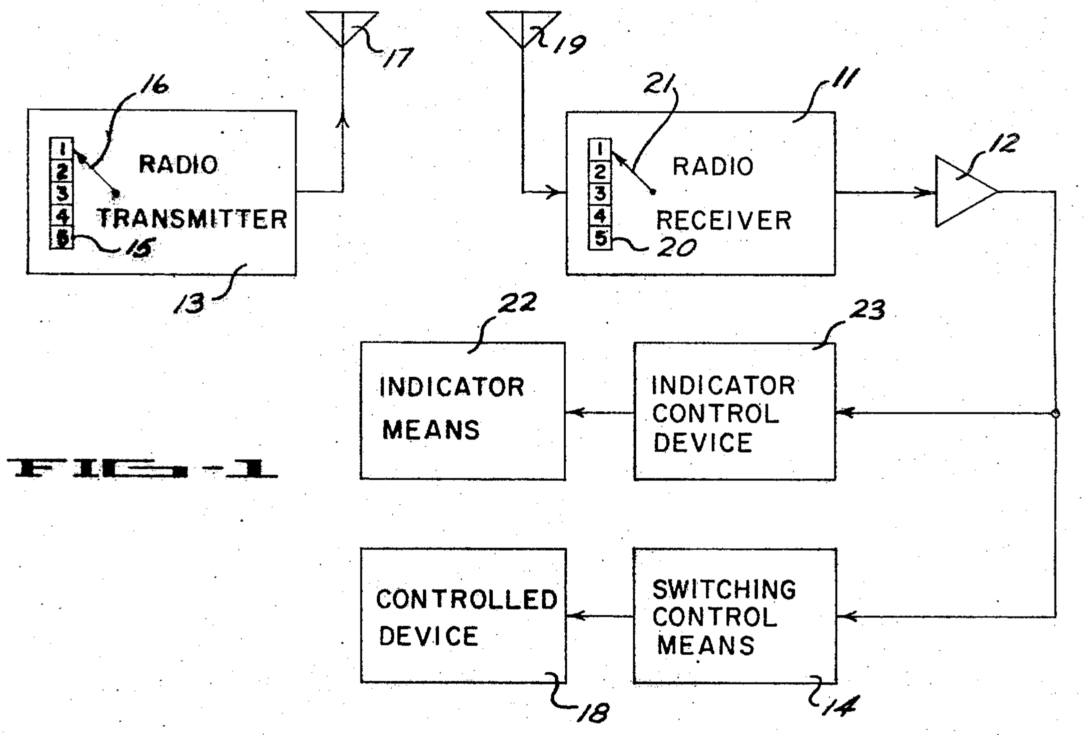

This invention relates to a monitoring system for a remote radio control, and more particularly to such a system for use with a multiple channel control system in verifying the operating conditions of such channels.

Remote radio controls are utilized extensively to control various electronic and mechanical operations, such as, for example, the shutter and film advance operation of a camera. In many of the radio controls utilized, a plurality of corresponding transmitting and receiving channels are provided to enable the selection of one of these channels to assure operation which is free from interference from other transmitting equipment and from noise sources. It is often difficult for the operator to determine which is the optimum channel in view of the lack of any accurate monitoring equipment for this purpose. Thus, channel selection is made in a relatively hit-or-miss fashion by means such as a simple audio check, with little positive assurance that control operations will not be impaired by interfering signals. Further, with the controlled equipment set at a distance separated from the operator, no means are available, once the equipment is set in position ready for use, to assure that an interfering signal has not appeared in the interim. Further there is no positive indication to the operator provided in such prior art system which clearly and unequivocally indicates that the controlled operation has been performed. Thus, in the case of operations which are not readily apparent to the operator, such as for example the actuation of a camera shutter, the operator has no immediate assurance that the desired actuation has taken place.

The device of this invention overcomes the shortcomings of prior art control devices in providing means for generating a positive visual indication of the level of signals in the receiver control channel. This indication provides monitoring information indicative of the noise and interference signal conditions on the monitored channel at all times, thus enabling optimum channel selection. Further, the signal also provides an immediate positive indication of the reception of the transmitter signal which controls the desired operation, thus verifying proper operation and enabling the positioning of the transmitter and receiver for optimum transmission and reception.

In achieving the desired indication, the device of the invention utilizes indicator means which may be in the form of an indicator lamp, which is actuated in accordance with the signal level output of the control receiver.

The output of the receiver is appropriately amplified and fed to an indicator control device which is adjusted so that it immediately actuates the indicator means in accordance with the signal level of the receiver output. Thus, a constant indication is provided of the level of signals received by the control receiver, including both noise and interference signals and control signals emitted by the control transmitter. The monitoring device utilized, while completely reliable and accurate in its indicating capabilities, is relatively simple and economical in its configuration.

It is therefore an object of this invention to improve the operation of remote radio control devices.

It is a further object of this invention to facilitate the selection of a proper operating channel for a remote radio control device.

It is still another object of this invention to provide a simple yet highly reliable device for checking the conditions of a channel in a remote radio control device.

It is still another object of this invention to provide a channel monitoring device for a remote radio control which furnishes a constant visual indication of the signal conditions on the selected control channel.

It is still another object of this invention to provide more reliable and accurate operation of remote radio control devices.

Figure 2:
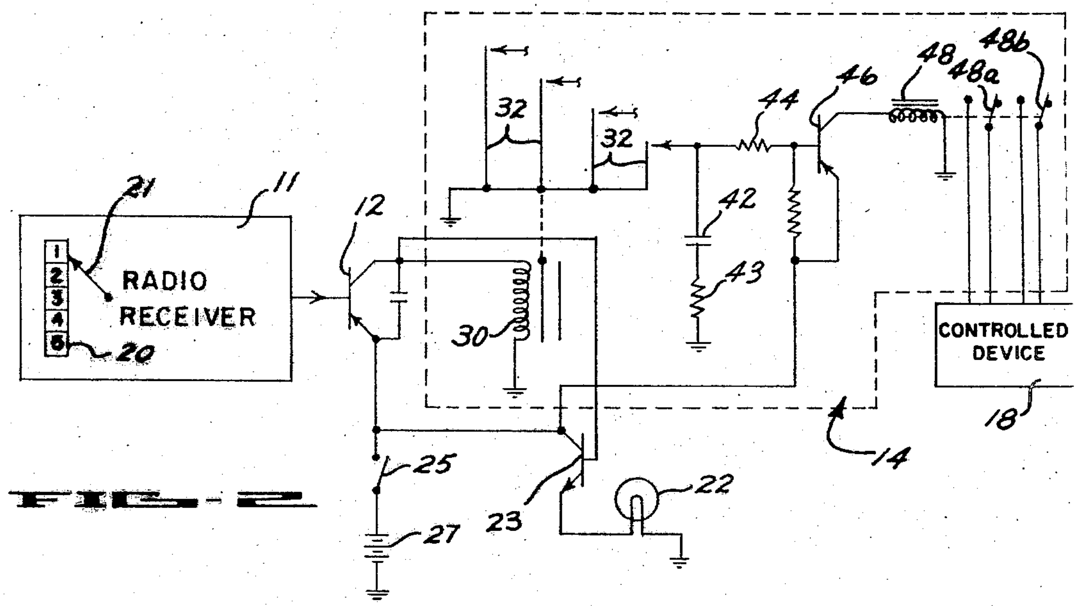

Other objects of this invention will become apparent from the following description taken in connection with the accompanying drawings, of which FIG. 1 is a block diagram illustrating the operation of the device of the invention, and FIG. 2 is a schematic drawing of a preferred embodiment of the device of the invention.

Referring now to FIG. 1, radio control signals are generated by radio transmitter 13 and emitted from this transmitter by means of antenna 17. One of several control channels 15 is selected by means of switch 16. Control channels 15 may utilize frequency determining piezoelectric control crystals operating in an appropriate oscillator circuit. The signals emitted by antenna 17 are received by antenna 19 and fed to radio receiver 11.

Radio receiver 11 has a plurality of control channels 20 which correspond to the transmitting channels 15 of transmitter 13. One of channels 20 may be appropriately selected to correspond with the transmitting channel by means of switch 21. The output of radio receiver 11, which is an audio frequency signal, is amplified by means of amplifier 12 and then fed to indicator control device 23 and switching control means 14.

Switching control means 14 may include an appropriate relay device which actuates controlled device 18 in response to control signals received by radio receiver 11. Thus, for example, switching control means 14 may comprise a relay device which appropriately actuates a controlled device 18 which may be in the form of a camera film advance mechanism.

Radio receiver 11 has no way of discriminating between signals received on the selected channel from radio transmitter 16 and from other sources, such as, for example, from other transmitters or noise generating sources. Thus, extraneous signals could cause the operation of switching control means 14 resulting in the erroneous operation of controlled device 18. To alleviate this problem, a plurality of control channels 15 and 20 are provided so that in the event that interfering signals are present on any of the channels, another of the channels may be utilized. To facilitate channel selection and to provide a positive indication of the control operation, the output of amplifier 12 is fed to indicator switching device 23 which actuates indicator means 22 in accordance with the output of radio receiver 11. Indicator means 22 thus provides an indication in accordance with the signal output level of receiver 11 to constantly apprise the operator of the presence of interfering signals which might cause faulty operation of the control system, as well as an indication when the system is operating in response to the desired control.

Referring now to FIG. 2, a schematic drawing of a preferred embodiment of the device of the invention is shown. The signals received by radio receiver 11 are appropriately detected and the detected audio output is fed to the base of transistor 12 which operates to amplify these signals. The control system is turned on by means of power switch 25, which connects power from DC power source 27 to the various transistor circuits utilized. The output of transistor 12 is fed to reed relay coil 30. Reed relay coil 30 operates in conjunction with vibrating reeds 32, the magnetic core of this coil being mechanically coupled to the vibrating reeds. The control signals received by radio receiver from radio transmitter 13 are modulated at predetermined frequencies, each such frequency corresponding to a particular mode of control. Thus, the audio frequency of the demodulated signals fed to coil 30 from transistor 12 will correspond to the desired control. Each reed 32 resonates at a separate predetermined control frequency, and thus an appropriate one of these reeds will be set into vibration in accordance with the signal received and fed to reed relay coil 30.

For the purposes of illustration only one of the reed relay control circuits is shown. Each reed operates in conjunction with a circuit similar to the one shown and to be described. The vibrating output of reed 32 is filtered by means of the R–C filter network comprising capacitor 42 and resistors 43 and 44, and fed to relay control transistor 46. Transistor 46 actuates relay 48 in response to the signals received thereby, and with the resultant closing of relay contacts 48*a* and 48*b*, control device 18 is appropriately operated in accordance with the desired control.

The desired signal level indication is provided by means of indicator lamp 22, which comprises an incandescent pilot lamp operating in conjunction with transistor 23. The base of transistor 23 is connected to the collector of transistor 12 so that the output of radio receiver 11 as amplified by transistor 12 is fed between the emitter-base junction of transistor 23. Transistor 23 is bised so that it conducts slightly under predetermined normal "clear channel" operating conditions, i.e., without interfering noise or other spurious signals on the receiving channel. Thus, indicator lamp 22 through which the emitter current of transistor 23 passes will glow at or near the threshold of visibility.

In selecting an optimum operating channel, selector switch 21 is thrown to each channel while indicator lamp 22 is observed to determine the channel having the minimum spurious signal level as indicated by minimum glow of indicator lamp 22. When the optimum receiver channel has been selected, and the operator is ready to operate the radio transmitter, indicator lamp 22 is observed by the operator so that he can verify whether or not the originally selected channel still is clear. If some interference has appeared, a new channel can be selected. With each control actuation by the operator, indicator lamp 22 will come to full brilliance, thus providing an immediate indication that such control is being accomplished.

The device of this invention thus provides simple yet highly effective means for monitoring the control channel of a radio remote control device, both to assure the selection of an interference free channel and to verify operation in response to the control signal.

While the device of the invention has been described and illustrated in detail, it is to be clearly understood that this is intended by way of illustration and example only and is not to be taken by way of limitation, the spirit and scope of this invention being limited only by the terms of the following claims.

I claim:

1. A device for monitoring the operation of a remote radio control system comprising
   transmitter means for generating control signals,
   receiver means for receiving said control signals,
   a controlled device,
   amplifier means connected to receive the output of said receiver means,
   switching control means responsive to the output of said amplifier means for actuating said controlled device,
   indicator means, and
   indicator control means responsive to the output of said amplifier means for actuating said indicator means, said indicator control means including a transistor responsively connected to said amplifier means and biased so that it conducts slightly in the absence of any substantial signals on said receiver means, said indicator means being connected in series with the emitter-collector current path of said transistor,
   whereby said indicator means is actuated at its threshold of operation in the absence of interfering signals or control signals in the output of said receiver means and said indicator means is actuated to provide substantial output when control or interfering signals are present in the output of said receiver means.

2. The device as recited in claim 1, wherein said indicator means comprises an incandescent lamp connected in series with said transistor, the bias on said transistor being adjusted to cause said lamp to glow at the threshold of visibility in the absence of interference and control signals in the output of said receiver.

3. The device as recited in claim 1 wherein said receiver and transmitter means each include a plurality of corresponding control channels and means for selecting one of said control channels.

4. A device for monitoring the operation of a remote radio control system comprising
   transmitter means for generating control signals,
   receiver means for receiving said control signals,
   a control led device,
   amplifier means connected to receive the output of said receiver means,
   a power source,
   switching control means responsive to the output of said amplifier means for actuating said controlled device,
   indicator means, and
   indicator control means responsive to the output of said amplifier means for actuating said indicator means, said indicator control means including a transistor responsively connected to said amplifier means, the emitter and collector of said transistor being connected between said power source and said indicator means, said transistor being biased so that it conducts slightly in the absence of any substantial signals on said receiver means,
   whereby said indicator means is actuated at its threshold of operation in the absence of interfering signals or control signals in the output of said receiver means and said indicator means is actuated to provide substantial output when control or interfering signals are present in the output of said receiver means.

5. The device as recited in claim 4 wherein said switching control means includes a reed relay having an actuation coil connected to receive the output of said receiver means, the base of said transistor being connected to said coil.

6. A device for monitoring the operation of a remote radio control system comprising transmitter means having a plurality of control channels for generating control signals, receiver means having a plurality of control channels corresponding to those of said transmitter means for receiving said control signals, a controlled device, amplifier means connected to receive the output of said receiver means, said transmitter and receiver means each including means for selecting one of said control channels, switching control means responsive to the output of said amplifier means for actuating said controlled device, and means for enabling the selection of a control channel having minimum interference thereon including an indicator device and indicator control means responsive to the output of said amplifier means for actuating said indicator device, said indicator control means including a transistor responsively connected to said amplifier means and biased so that it conducts slightly in the absence of substantial signals on said receiver means, said indicator devices being connected in series with the emitter-collector current path of said transistor, whereby said indicator device is actuated at its threshold of operation in the absence of interfering signals or control signals in the output of said receiver means and said indicator device is actuated to provide substantial output when control or interfering signals are present in the output of said receiver means.

7. The device as recited in claim 6 wherein said indicator device includes an incandescent lamp connected in series with said transistor.

References Cited

UNITED STATES PATENTS

| | | | |
|---|---|---|---|
| 2,395,850 | 3/1946 | Colman | 340—253 |
| 3,281,837 | 10/1966 | Van Hijfte | 343—18 |
| 3,228,278 | 1/1966 | Wortman | 340—171 |
| 3,333,272 | 5/1967 | Deming | 343—225 |

FOREIGN PATENTS

| | | |
|---|---|---|
| 923,744 | 4/1963 | Great Britain. |

JOHN W. CALDWELL, *Primary Examiner.*

A. J. KASPER, *Assistant Examiner.*